United States Patent
Nadler et al.

(10) Patent No.: US 10,482,671 B2
(45) Date of Patent: Nov. 19, 2019

(54) SYSTEM AND METHOD OF PROVIDING A VIRTUAL ENVIRONMENT

(71) Applicant: Hashplay Inc., San Francisco, CA (US)

(72) Inventors: Ingo Nadler, Bad Breisig (DE); Jan-Philipp Alexander Mohr, Hamburg (DE)

(73) Assignee: Hashplay Inc., San Francisco, CA (US)

( * ) Notice: Subject to any disclaimer, the term of this patent is extended or adjusted under 35 U.S.C. 154(b) by 13 days.

(21) Appl. No.: 15/847,210

(22) Filed: Dec. 19, 2017

(65) Prior Publication Data

US 2018/0247457 A1 Aug. 30, 2018

Related U.S. Application Data

(60) Provisional application No. 62/435,972, filed on Dec. 19, 2016.

(51) Int. Cl.
| | |
|---|---|
| G06T 17/00 | (2006.01) |
| G06T 19/00 | (2011.01) |
| G06F 3/01 | (2006.01) |
| A63F 13/525 | (2014.01) |
| G06T 3/40 | (2006.01) |
| H04L 29/06 | (2006.01) |
| A63F 13/355 | (2014.01) |

(52) U.S. Cl.
CPC .......... G06T 19/006 (2013.01); A63F 13/355 (2014.09); A63F 13/525 (2014.09); G06F 3/011 (2013.01); G06F 3/012 (2013.01); G06T 3/4092 (2013.01); G06T 19/003 (2013.01); H04L 67/38 (2013.01)

(58) Field of Classification Search
CPC ......... G06T 17/20; G06T 15/00; G06T 15/04; G06T 2210/36; G09G 5/391
USPC ....................................................... 345/428
See application file for complete search history.

(56) References Cited

U.S. PATENT DOCUMENTS

2018/0089903 A1* 3/2018 Pang ...................... H04N 19/33
2018/0302614 A1* 10/2018 Toksvig ............... G06K 9/6269

* cited by examiner

*Primary Examiner* — Gordon G Liu
(74) *Attorney, Agent, or Firm* — Ziegler IP Law Group, LLC

(57) ABSTRACT

A system for providing a virtual environment on an at least one computing device. The system includes, a server arrangement to generate at least one first image associated with the virtual environment on at least one first virtual pattern, render visual orientations associated with the at least one first image on a render target, and generate at least one second image; and at least one computing device, communicably coupled with the server arrangement, to receive the at least one second image from the server arrangement, render each of the render targets of the at least one second image on an at least one second virtual pattern, determine the movement of head of the at least one user, and provide the virtual environment on a display arrangement based on a movement of head of the at least one user.

22 Claims, 2 Drawing Sheets

SYSTEM AND METHOD OF PROVIDING A VIRTUAL ENVIRONMENT

TECHNICAL FIELD

The present disclosure relates generally to virtual reality; and more specifically, to systems for providing a virtual environment. Furthermore, the present disclosure relates to methods of providing a virtual environment.

BACKGROUND

Recently, the use of technologies such as virtual reality and augmented reality has rapidly increased in applications like gaming, education, healthcare, and so forth. Typically, such technologies present a simulated environment, often known as 'virtual environment' to users. Furthermore, the virtual environment may comprise computer generated imagery (CGI), such as an environment associated with a game and/or a real environment, such as an office. Generally, the user uses a device or an apparatus, such as a virtual reality system, for experiencing such simulated environment.

Currently virtual reality systems use 3D engines for optimizing a planar representation of a 3-dimensional space. Furthermore, the planar projection represents a particular field of view into a space of the virtual environment. Such field of view is provided to one or more user connected to the virtual reality system.

However, such conventional virtual reality system includes various difficulties. For example, such conventional virtual reality systems are convenient for single user scenario, low complexity environments. Additionally, such conventional virtual reality systems can efficiently function when associated with powerful computers. Moreover, the inclusion of more than one user can cause problems for such conventional virtual reality system, such as synchronizing the contents in the virtual reality system for the individual user. Furthermore, the conventions virtual reality system that has one or more users is configured to change the content in the associated computing devices that are used by the user. Such arrangement includes challenges like consuming extensive computational power, memory, and the likes.

Therefore, in light of the foregoing discussion, there exists a need to overcome the aforementioned drawbacks associated with the rendering of a visual scene in conventional virtual reality system.

SUMMARY

The present disclosure seeks to provide an improved system for providing a virtual environment on an at least one computing device.

The present disclosure also seeks to provide an improved method of providing a virtual environment.

The present disclosure seeks to provide a solution to the existing problem of the existing problem of rendering a visual scene in computing devices. An aim of the present disclosure is to provide a solution that overcomes at least partially the problems encountered in the prior art and provides efficient means of rendering of a visual scene in one or more computing device.

According to a first aspect, an embodiment of the present disclosure provides a system for providing a virtual environment on an at least one computing device, the system comprising:

a server arrangement operable to:

generate at least one first image associated with the virtual environment on at least one first virtual pattern, wherein the at least one first virtual pattern corresponds to visual orientations of at least one user within the virtual environment;

render each of the visual orientations associated with the at least one first image on a render target; and generate at least one second image using each of the render targets;

and at least one computing device communicably coupled with the server arrangement, each of the at least one computing device comprising a display arrangement for displaying the virtual environment to at least one user of the at least one computing device and a sensor arrangement for determining a movement of head of the at least one user, wherein the at least one computing device is operable to:

receive the at least one second image from the server arrangement;

render each of the render targets of the at least one second image on an at least one second virtual pattern, wherein the at least one second virtual pattern corresponds to visual orientations of the at least one user within the virtual environment;

determine the movement of head of the at least one user; and provide the virtual environment on the display arrangement by displaying the visual orientations of the virtual environment to the at least one user based on the movement of head of the at least one user.

The environment map is user view independent as it is a 360° representation of the environment. The user's individual view only happens on the connected computing device as the user sees the part of the environment map that corresponds to his view.

According to a second aspect, an embodiment of the present disclosure provides a method of providing a virtual environment, the method comprising:

generating at least one first image associated with the virtual environment on at least one first virtual pattern, wherein the at least one first virtual pattern corresponds to visual orientations of at least one user within the virtual environment;

rendering each of the visual orientations associated with the at least one first image on a render target;

generating at least one second image using each of the render targets;

rendering each of the render targets of the at least one second image on an at least one second virtual pattern, wherein the at least one second virtual pattern corresponds to visual orientations of the at least one user within the virtual environment;

determining a movement of head of at least one user; and providing the virtual environment by displaying the visual orientations to the at least one user based on the movement of head of the at least one user.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
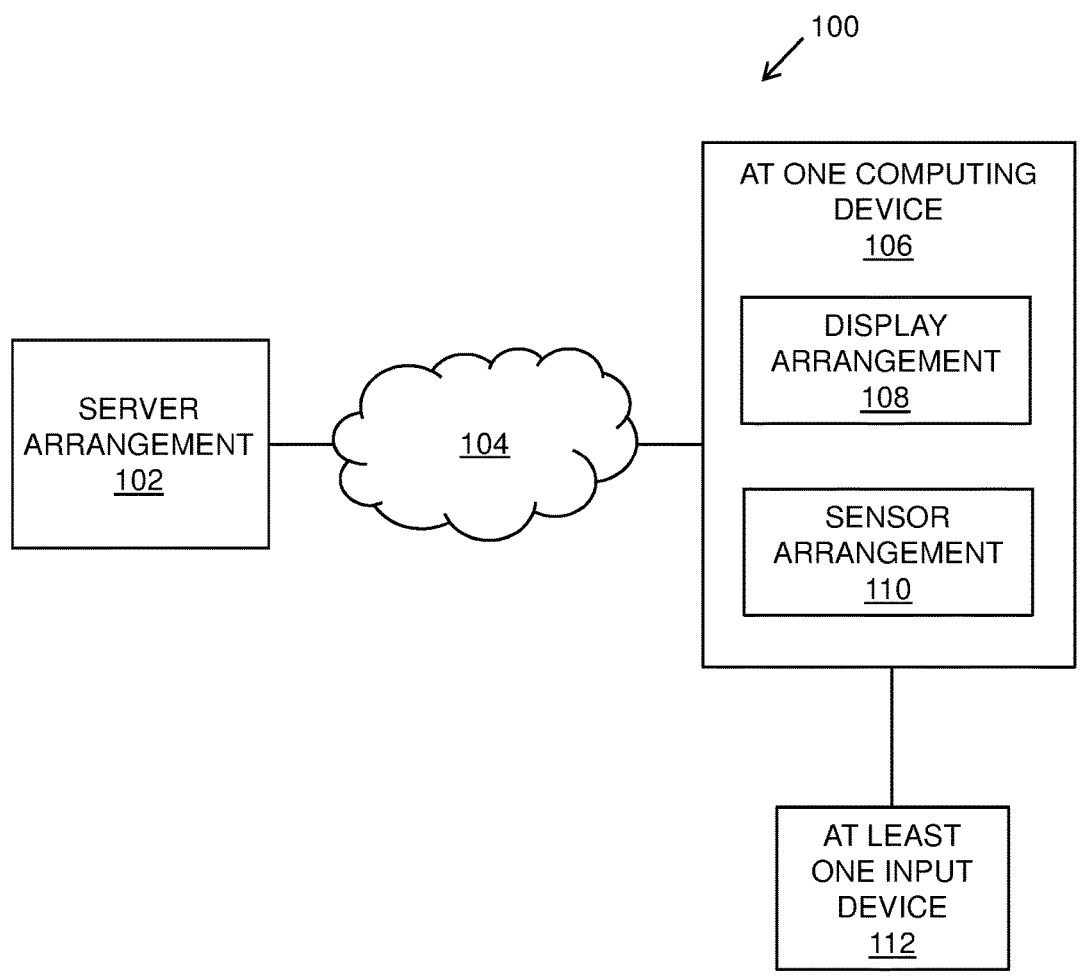
FIG. 1 is block diagram of a system for providing a virtual environment on at least one computing device, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

Detailed Description of Embodiments

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Glossary

Brief definitions of terms used throughout the present disclosure are given below.

Throughout the present disclosure, the term "virtual environment" relates to a virtual surrounding that a given user is required to be present within. Such a virtual environment is a representation of a real environment, and/or a simulation of a situation that can occur in real world. It will be appreciated that real environment and real world refers to non-imaginary environments that includes non-computer based events. Optionally, such a virtual environment is an imaginary environment that is designed for providing a user with an immersive experience of virtual reality.

In an example, the virtual environment is a simulation of an inner and outer surrounding of a warzone bunker in a computer-based gaming environment, such as a combat game. However, it will be appreciated that the term "virtual environment" refers to any environment that represents a scenario associated with the user. In one example, the virtual environment may represent a virtual ceramic art work environment for designing ceramic art works. In such an instance, the virtual environment may be rendered by presenting two distinct perspectives of a surrounding (such as left and right perspective views of the surrounding) to the user, by employing a technique such as stereoscopy, to provide a perception of stereoscopic depth within the environment. Furthermore, the user can change their viewing direction, for example, to change a direction of travel within the virtual environment, the user can interact with an object presented within the virtual environment and so forth.

Throughout the present disclosure, the term "at least one computing device" relates to an electronic device associated with (or used by) a user, that is capable of enabling the user to perform specific tasks associated with the system and/method. Furthermore, the at least one computing device is intended to be broadly interpreted to include any electronic device that can be used for voice and/or data communication over a communication network. Moreover, at least one computing device can alternatively be referred to as a mobile station, a mobile terminal, a subscriber station, a remote station, a user terminal, and the likes. Examples of at least one computing device include, but are not limited to, smart phones, personal digital assistants (PDAs), laptop computers, personal computers, and the likes. Additionally, the at least one computing device includes a casing, a memory, a processor, a network interface card, a microphone, a speaker, a keypad, and a display.

Throughout the present disclosure, the term "server arrangement" relates to a structure and/or module that include programmable and/or non-programmable components configured to store, process and/or share information. The server arrangement includes any arrangement of physical or virtual computational entities capable of enhancing information to perform various computational tasks. Furthermore, it should be appreciated that the server arrangement can include both single hardware server and/or plurality of hardware servers operating in a parallel or distributed architecture. In an example, the server arrangement may include components such as memory, a processor, a network adapter and the like, to store, process and/or share information with other computing components, such as the at least one computing device. Optionally, the server arrangement is implemented as a computer program that provides various services to the connected devices. For example, the server arrangement can generate one or more server-rendered video streams based on instance(s) of an application executed on the server arrangement and provide the rendered video to the connected devices.

Throughout the present disclosure, the term "network interface" relates to an arrangement of interconnected programmable and/or non-programmable components that are configured to facilitate data communication between one or more electronic devices and/or databases, whether available or known at the time of filing or as later developed. Furthermore, the network include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the network includes wired or wireless communication that can be carried out via any number of known protocols, including, but not limited to, Internet Protocol (IP), Wireless Access Protocol (WAP), Real-time Streaming Protocol (RTSP), Frame Relay, or Asynchronous Transfer Mode (ATM). Moreover, although the system is frequently described herein as being implemented with TCP/IP communications protocols, the system can also be implemented using IPX, Appletalk, IP-6, NetBIOS, OSI, any tunneling protocol (e.g. IPsec, SSH), or any number of existing or future protocols Throughout the present disclosure, the term "data connection" relates to a connection established via the network interface for transmitting signals represents data. The data connection can be wireless (e.g., radio-based), electrical, electronic, and other forms of digital or analog data modes used for data transmission. Furthermore, a quality can be associated with the data connection, which refers to the speed (bit rate) of data transmissions, as well as other objective measures of the data communications between two devices, such as packet loss, latency, jitter and other aspects.

Throughout the present disclosure, the phrase "strength of the data connection" relates to a bandwidth of the data connection. The strength of the data connection refer to the data rate of a channel, which typically refers to the data communicated in a defined time period (e.g., 300 bits per second), the Buffer Occupancy (BO) of a channel, which typically refers to the size of the data to be transmitted (e.g., 300 bits), the instantaneous data rate of a channel, which typically refers to the data communicated at any particular instant of time. Optionally, the phrase "strength of the data connection" can be used interchangeably with the terms "data rate," "instantaneous data rate," "Buffer Occupancy" or variations thereof when referring to the bandwidth of a logical channel. Throughout the present disclosure, the phrase "virtual pattern" relates to an environment map that represents a position of one or more objects in an environment (such as a real world environment, virtual environment, and the likes). The virtual pattern is used to arrange inter-object reflections (such as an image) that occur when a surface of an object reflects other objects in its surrounding environment. An image can also include a video, which is a sequence of images. There are two types of environment maps that are typically used, a cube environment map and a sphere environment map. The environment map is user view independent as it is a 360° representation of the environment. The user's individual view only happens on the connected computing device as the user sees the part of the environment map that corresponds to his view.

A cube environment map has six texture images that correspond to the six faces of a cube. The center of the cube environment map is referred to as the center of projection. At each vertex of an object (polygon) to be environment mapped, a reflection vector is computed. This reflection vector indexes one of the six texture images that make up the cube environment map. If all the vertices of the object generate reflections that point to a single texture image of the cube environment map, that texture image can be mapped onto the object using projective texturing. If an object has reflections that point to more than one texture image of the cube environment map, the object is subdivided into pieces, each of which generates reflection vectors that point to only one texture image.

A sphere map has a single texture image. This texture image comprises a circle representing the hemisphere of the environment behind a viewer, surrounded by an annulus representing the hemisphere in front of the viewer. The texture image is that of a perfectly reflecting sphere located in the environment when the viewer is infinitely far from the sphere. At each object (polygon) vertex, a texture coordinate generation function generates coordinates that index this texture image, and these are interpolated across the object.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based upon the present disclosure provided herein, one of ordinary skill in the art will appreciate a variety of ways in which connection or coupling exists in accordance with the aforementioned definition.

The terms "first", "second", and the like, herein do not denote any order, quantity, or importance, but rather are used to distinguish one element from another. Furthermore, the terms "a" and "an" herein do not denote a limitation of quantity, but rather denote the presence of at least one of the referenced item.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Embodiments of the Present Disclosure

In a first aspect, an embodiment of the present disclosure provides a system for providing a virtual environment on an at least one computing device, the system comprising:
  a server arrangement operable to:
    generate at least one first image associated with the virtual environment on at least one first virtual pattern, wherein the at least one first virtual pattern corresponds to visual orientations of at least one user within the virtual environment;
    render each of the visual orientations associated with the at least one first image on a render target; and
    generate at least one second image using each of the render targets;
  and
    at least one computing device communicably coupled with the server arrangement, each of the at least one computing device comprising a display arrangement for displaying the virtual environment to at least one user of the at least one computing device and a sensor arrangement for determining a movement of head of the at least one user,
  wherein the at least one computing device is operable to:
    receive the at least one second image from the server arrangement;
    render each of the render targets of the at least one second image on an at least one second virtual pattern, wherein the at least one second virtual pattern corresponds to visual orientations of the at least one user within the virtual environment;
    determine the movement of head of the at least one user; and
    provide the virtual environment on the display arrangement by displaying the visual orientations of the virtual environment to the at least one user based on the movement of head of the at least one user.

In a second aspect, an embodiment of the present disclosure provides a method of providing a virtual environment, the method comprising:
  generating at least one first image associated with the virtual environment on at least one first virtual pattern, wherein the at least one first virtual pattern corresponds to visual orientations of at least one user within the virtual environment;
  rendering each of the visual orientations associated with the at least one first image on a render target;
  generating at least one second image using each of the render targets;

rendering each of the render targets of the at least one second image on an at least one second virtual pattern, wherein the at least one second virtual pattern corresponds to visual orientations of the at least one user within the virtual environment;

determining a movement of head of at least one user; and providing the virtual environment by displaying the visual orientations to the at least one user based on the movement of head of the at least one user.

The server arrangement of the system is operable to generate at least one first image associated with the virtual environment on the at least one first virtual pattern. The at least one first image is an aggregation of a plurality of image frames. In an example, the at least one first image comprises a three-dimensional view of the virtual environment. For example, the virtual environment is associated with a three-dimensional view within a gaming environment, such as a scene 'A' in a combat game. In such example, the scene 'A' may be a view of a ship deck form a superstructure of the ship. In such an instance, the at least one first image of the scene 'A' enables the user to view different visual perspectives within the scene 'A'.

The at least one first image is at least one of a still image and/or a video frame of a video associated with the virtual environment. Optionally, the at least one first image is captured using a camera arrangement that comprises a digital camera and/or a stereoscopic camera. It will be appreciated that the digital camera enables a user thereof to capture one or more images. Optionally, the camera arrangement can comprise one or more virtual camera. The one or more virtual camera refers to a point of view within the virtual environment that may be used for rendering two-dimensional images of a three-dimensional scene within the virtual environment. The virtual camera defines the field of view for a user in the virtual environment. Furthermore, virtual camera can be configured to replicate the functions of a real word camera, namely move forward or backward, to the left or right, and up or down, pan, zoom, or change focus and focal points. In such an instance, the camera arrangement is used to capture still images associated with various visual perspectives of the virtual environment. Furthermore, the various still images are combined to generate a three-dimensional image of the virtual environment. Optionally, the three-dimensional image can be an equirectangular and cubemap representation of the virtual environment. In an example, the system may include a number of six cameras to capture six texture images of the virtual environment. Optionally, the camera arrangement configured to capture a video associated with the virtual environment is stereoscopic. Therefore, it will be appreciated that the camera arrangement captures videos associated with a visual perspective of the virtual environment that are slightly offset from each other.

Optionally, at least one virtual pattern used to generate at least one first image is a spare. For example, the sphere is a three-dimensional sphere that serves as a background layer that the at least one first image is mapped thereto. In one example, a point of reference associated with the user is positioned at center of the virtual sphere. It will be appreciated that such mapping of the at least one first image to the virtual sphere and moreover, positioning of the point of reference associated with the user at the center thereof enables to provide a visual standpoint associated with any viewing direction of the user within the environment. Optionally, at least one virtual pattern used to generate at least one first image is a cube. For example, the cube is a three-dimensional cube environment map that serves as a background layer that the at least one first image is mapped thereto. In one example, a point of reference associated with the user is positioned at center of the cube environment map. It will be appreciated that such mapping of the at least one first image to the cube environment map and moreover, positioning of the point of reference associated with the user at the center thereof enables to provide a visual standpoint associated with any viewing direction of the user within the environment.

The at least one first virtual pattern corresponds to visual orientations of at least one user within the virtual environment. The visual orientations of at least one user determine the field of view for the at least one user in the virtual environment. Furthermore, the visual orientation of at least one user within the virtual environment refers to the direction towards which the at least one user is visually focused. Optionally, the visual orientations of the at least one user within the virtual environment comprises: a front view, a rear view, a left view, a right view, a top view, and/or a bottom view. The front view, the rear view, the left view, the right view, the top view, and/or the bottom view are the portions of the virtual environment with respect to the position of the at least one user. In an example, the virtual environment may be a superstructure of the ship. In such example, a view of a front portion of the superstructure may include a sight of the ship deck, a view of a rear portion of the superstructure may include a sight of a rear wall of the superstructure, a view of a left portion of the superstructure may include a sight of a water body (such as a sea) in which the ship is located, a view of a right portion of the superstructure may include a sight of a port to which the ship is harbored, a view of a top portion of the superstructure may include a sight of a roof of the superstructure of the ship, a view of a bottom portion of the superstructure may include a sight of a floor of the superstructure of the ship, In such example, if the at least one user is located at the center of the superstructure of the ship, the front view includes the ship deck, the rear view includes the rear wall of the superstructure, the left view includes the sea, the right view includes the port to which the ship is harbored, the top view includes the roof of the superstructure, and the bottom view includes floor of the superstructure.

Optionally, the at least one first image associated with the virtual environment comprises a left visual perspective and a right visual perspective of the at least one user of the virtual environment. The left visual perspective of the at least one user of the virtual environment relates to a field of view that includes a visual perspective of left eye of the at least one user. The right visual perspective of the at least one user of the virtual environment relates to a field of view that includes a visual perspective of right eye of the at least one user. Therefore, the at least one first image can include plurality of still images related to a portion of the virtual environment, furthermore, the plurality of still images can include two viewing perspective, namely left perspective and right perspective, of the portion of the virtual environment. According to an aforementioned example, a portion of the virtual environment may include the view of the ship deck. In such example, the plurality of still images may store the two perspective views of the ship deck, namely a perspective view of the ship deck with respect to the left eye of the at least one user and a perspective view of the ship deck with respect to the right eye of the at least one user. The purpose of generating separating images is to provide a stereoscopic effect and/or three dimensional effects while displaying the portion of the virtual environment to the at least one user.

Optionally, the server arrangement is further operable to generate the left visual perspective and the right visual perspective on separate virtual patterns of the at least one first virtual pattern. Optionally, the left visual perspective of a portion of the virtual environment is mapped to a distinct virtual pattern, and the right visual perspective is mapped to another distinct virtual pattern. Optionally, the virtual pattern used to map the left visual perspective and the right visual perspective is stored in two distinct cube environment maps. Alternatively, the virtual pattern used to map the left visual perspective and the right visual perspective is stored in two distinct sphere environment maps.

The server arrangement is operable to render each of the visual orientations associated with the at least one first image on a render target. Specifically, each visual orientation of the front view, a rear view, a left view, a right view, a top view, and/or a bottom view will be rendered in separate render target. The render target refers to a collection of data associated with one or more renderings associated with one or more scenes. For example, a render target in a cube environment map may be configured to store one perspective (namely left visual perspective) of a visual orientation of a virtual environment. In such example, a first render target is operable to store a front view of a virtual environment with respect to the left visual perspective of at least one user, a second render target is operable to store a rear view of a virtual environment with respect to the left visual perspective of at least one user, a third render target is operable to store a left view of a virtual environment with respect to the left visual perspective of at least one user, a forth render target is operable to store a right view of a virtual environment with respect to the left visual perspective of at least one user, a fifth render target is operable to store a top view of a virtual environment with respect to the left visual perspective of at least one user, and a sixth render target is operable to store a bottom view of a virtual environment with respect to the left visual perspective of at least one user. In another example, a render target in a cube environment map may be configured to store one perspective (namely right visual perspective) of a visual orientation of a virtual environment. In such example, a first render target is operable to store a front view of a virtual environment with respect to the right visual perspective of at least one user, a second render target is operable to store a rear view of a virtual environment with respect to the right visual perspective of at least one user, a third render target is operable to store a left view of a virtual environment with respect to the right visual perspective of at least one user, a forth render target is operable to store a right view of a virtual environment with respect to the right visual perspective of at least one user, a fifth render target is operable to store a top view of a virtual environment with respect to the right visual perspective of at least one user, and a sixth render target is operable to store a bottom view of a virtual environment with respect to the right visual perspective of at least one user.

The server arrangement is operable to generate at least one second image using each of the render targets. The at least one second image include all the render targets mapped in the separate virtual patterns. The render targets are arranged in a manner that can create a stereoscopic effect. The purpose of arranging the render targets in a stereoscopic manner is to achieve a sequential stereo effect. Optionally, the server arrangement can include one or more application that is operable to arrange the render targets in a stereoscopic manner. In an example, the application for arranging the render targets in a stereoscopic manner may be a video encoder. In such example, the video encoder is operable to generate a video frame from one or more image, such as the plurality of still images of the perspective views of the virtual environment. Furthermore, the server arrangement can include hardware to host the application that is operable to arrange the render targets in a stereoscopic manner.

The at least one computing device communicably coupled with the server arrangement. Furthermore, communicably coupled refers to attachments of two or more elements (such as the at least one computing device and the server arrangement) so that the two or more elements are capable of exchanging electrical signals therebetween. For the purpose of this description, the communicable coupling is provided using wires or cables. However, it should be clearly understood that such a use of wires or cables should not be construed as a limitation to the present invention. Optionally, the at least one computing device is communicably coupled with the server by establishing a data connection via a network interface. Optionally, the data connection via a network interface provides a content delivery network.

According to the system, each of the at least one computing device comprises a display arrangement for displaying the virtual environment to at least one user of the at least one computing device. The display arrangement as used herein relates to a display suitable for use in displaying digital content such as multimedia content. The display arrangement is electronic in nature. For example, the display arrangement may include a cathode ray tube (CRT), projection-type displays, liquid crystal display (LCD), plasma, light-emitting diode (LED)-type, and including both 2D and 3D equivalents. Optionally, the display arrangement includes an active feedback component that allows users to contact or otherwise select a specific area of the display arrangement to thereby input data to interact with the digital content (such as the provided location-based promotional information) displayed therein.

Optionally, an active feedback component is a click, a keystroke or a longer gaze at certain areas of the image from the user with the computing device which may be sent back to the server arrangement and treated as interaction with the virtual environment. For this, certain areas of the image may be marked as "clickable" in a meta document that is sent along with the specific environment to allow user to interact with the specific areas of display.

Furthermore, each of the at least one computing device comprises a sensor arrangement for determining a movement of the head of the at least one user. The sensor arrangement as used herein relates to an assembly of sensors that are capable of communicating the sensor data. Furthermore, the sensor is a device that detects (and possibly responds to) signals, stimuli or changes in quantitative and/or qualitative features of a given system, or the environment in general, and provides a corresponding output. The output is generally a signal that can be converted to human-readable display at the sensor location or transmitted electronically over a network for reading or further processing. Additionally, the sensor arrangement includes any device which can provide a form of perceived perceptual information. Furthermore, the devices are operable to provide visual, auditory, tactile (e.g., touch, pressure), balance, or any combination of these perceptual information.

The sensor arrangement of the at least one computing device comprises one of, but not limited to, speed sensors, tilt sensors, inclinometers, and so forth to determine a movement of the head of the at least one user. Optionally, the sensory data received by the at least one computing device is thereafter provided to the server arrangement. Optionally, the server arrangement is operable to change the visual orientations of at least one user within the virtual environment based on the sensory data. For example, the sensory data may describe the at least one user movement of the users head form left to right. In such example, the server arrangement is operable to change the visual orientations of at least one user within the virtual environment form a left view to the right view.

The at least one computing device is operable to implemented as a head mounted device. For example, the at least one computing device is operable to display on the display arrangement video content from memory associated therewith. In one embodiment, the computing device is coupled to the head mounted device using at least one of a wired connection and/or a wireless connection. For example, the wired connection employs at least one cable for communicably coupling the at least one computing device to the head mounted device. In an embodiment, the system further comprises a connector for communicably coupling the at least one computing device to the head mounted device. For example, the head mounted device and/or the at least one computing device comprises an HDMI (High-Definition Multimedia Interface) port. In such an instance, the connector comprises an HDMI connector that is used to couple the at least one computing device to the head mounted device to provide high definition video content and optionally, audio content associated therewith. According to an embodiment, the wired connection is further employed to deliver electrical power to the head mounted device. In another embodiment, the wireless connection employs at least one of Bluetooth, infrared, ZigBee, Wi-Fi and/or internet. For example, the system further comprises a server arrangement that is communicably coupled to the at least one computing device via the internet. In such an instance, the server arrangement is used to stream the video content stored on the computing device to the head mounted device. Furthermore, providing such videos to the at least one user on the head mounted device, for example, on a left and right display thereof, will enable at least one user to perceive a stereoscopic depth associated with the virtual environment. Moreover, such videos may enable to provide the at least one user with an experience of movement within the virtual environment. For example, a video comprises various video frames associated with visual perspectives along a movement path through the virtual environment. In such an instance, the at least one first image is a video frame of the video associated with the virtual environment.

The at least one computing device is operable to receive the at least one second image from the server arrangement. The at least one second image received for the server arrangement includes one or more video frames. Furthermore, the video frames include all the render targets mapped in the separate virtual patterns.

The at least one computing device is operable to render each of the render targets of the at least one second image on an at least one second virtual pattern. Optionally, at least one second virtual pattern is similar to the at least one first virtual pattern, i.e. the second virtual pattern relates to an environment map that represents a position of one or more objects in an environment, for example, the second virtual pattern may be a cube environment map and a sphere environment map. Therefore each of the render targets of the at least one second image generated and communicated by the server arrangement can be arranged in the at least one second virtual pattern. The at least one second virtual pattern corresponds to visual orientations of the at least one user within the virtual environment. Optionally, the visual orientations of the at least one user comprises a front view, a rear view, a left view, a right view, a top view, and/or bottom view. Optionally, the rendering of each of the render targets of the at least one second image on an at least one second virtual pattern is implemented in a manner that is similar to the arrangement of the visual orientation of the at least one first image with the render targets. Therefore, each visual orientation of the front view, a rear view, a left view, a right view, a top view, and/or a bottom view will be rendered in separate render targets.

Optionally, the at least one computing device is further operable to render the left visual perspective on a second virtual pattern associated with left eye of the at least one user and the right visual perspective on a second virtual pattern associated with right eye of the at least one user. Optionally, the at least one computing device renders the two distinct perspectives of the virtual environment to the at least one user, by employing a technique such as stereoscopy. It will be appreciated that employing such technique will enable to provide the at least one user with a perception of stereoscopic depth within the environment. For example, the user may interact with other users and/or objects within the virtual environment for an immersive experience within the virtual environment. Furthermore, the at least one user can change their viewing direction, for example, to modify a visual perspective of the virtual environment that is presented thereto. Optionally, the left visual perspective and the right visual perspective are displayed alternatively to the at least one user to generate a frame sequential stereo effect. Optionally, the at least one computing device is operable to render the left visual perspective following a predefined time duration after rendering the right visual perspective. Therefore, while alternately displaying the left visual perspective and the right visual perspective a minute time gap (such as nanosecond) can be maintained. Alternatively, optionally, the at least one computing device is operable to render the right visual perspective following a predefined time duration after rendering the left visual perspective. Therefore, while alternately displaying the right visual perspective and the left visual perspective a minute time gap (such as nanosecond) can be maintained.

The at least one computing device is operable to determine the movement of the head of the at least one user. The movement of the head of the at least one user is determined using the sensor arrangement included in the at least one computing device. Optionally, at least one input device operably coupled with the at least one computing device. The at least one input device refers to one or more peripheral device that can be connected to the at least one computing device for controlling one or more functions of the computing device. For example, at least one input device may include a keyboard, a mouse, a stylus, a joystick, and the likes. The at least one input device is configured to provide the host computing device with one or more resources. For example, a peripheral device may provide input data to, or accept output data from, the host computing device. Furthermore, the at least one input device operably coupled with the at least one computing device via various wired and wireless means. For example, USB®, HDMI®, WIFI®, BLUETOOTH® and the likes Optionally, the at least one computing device is further operable to receive at least one input from the at least one user using the at least one input device. For example, the at least one user may use at least one input device such as a mouse to shift the field of view in the virtual environment. Optionally, modify the provided virtual environment based on the at least one input. For example, the at least one user may use at least one input device such as a mouse to shift the field of view from left to right in the virtual environment. In such instance the virtual environment may be operable to show the right side portion of the virtual environment more distinctly.

The at least one computing device is operable to provide the virtual environment on the display arrangement by displaying the visual orientations of the virtual environment to the at least one user based on the movement of the head of the at least one user. The virtual environment displayed on the display arrangement is configured to change which the movement of the head of the at least one user. Therefore, the virtual environment displayed on the display arrangement will include the orientation of the virtual environment, namely the front view, rear view, left view, right view, top view, and/or bottom view, towards which the head of the at least one user is directed to. For example, if the head of the at least one user is directed towards the left side of the at least one user the display arrangement is operable to display the left view of the virtual environment.

Optionally, the at least one first image and the at least one second image are associated with different image resolutions. Optionally, the pixel density of the at least one first image and the at least one second image are different. Optionally, the resolution of the at least one first image is greater than the at least one second image received at the at least one second image. Optionally, the server arrangement is configured to generate the at least one first image with a resolution of 3840×2560 pixels. The purpose of generating at least one first image with greater resolution is that the resolution least one first image can be decreased with the one or more limitations associated with displaying the at least one second image, such as low resolution computing device. Optionally, the server arrangement is further operable to increase or decrease the image resolution of the at least one first image based on the strength of the data connection. The server arrangement is operable to determine the strength of the of the data connection using one or more algorithms and modules installed therein. Therefore based on the determined strength of the of the data connection the server arrangement is operable to change the resolution of the at least one second image that is to be delivered to the at least one computing device.

Optionally, the server arrangement is operable to be connected to one or more users using one or more at least one computing device. In such instance, content generated at the server arrangement (namely the virtual environment) is configured to be accessed by the one or more users. Furthermore, in such event, the virtual environment accessed by the one user may be same or different. Additionally, an input provided by each of the one or more users may be operable to change the virtual environment.

The present description also relates to the method as described above. The various embodiments and variants disclosed above apply mutatis mutandis to the method.

The present disclosure provides the system and the method of providing a virtual environment on an at least one computing device. The system and the method provide an efficient arrangement for providing content to one or more users in a multiuser environment. The system and the method enables one or more users using different computing devices with varied computational power to access the same content and provide input to the content for altering the content. Furthermore, the system and the method provide a user-friendly arrangement with stereoscopic view of the content. Additionally, the one or more user accessing the virtual environment can have individual perspective. Moreover, the system and the method are operable to adjust the resolution of the virtual environment to be provided to the computing device based on the strength of the data communication and configuration of the computing device. Additionally, the system and the method are easy to implement and are capable of saving bandwidth of the content delivery network and computational power of the at least computing device.

DETAILED DESCRIPTION OF THE DRAWINGS

Referring to FIG. 1, there is shown a block diagram of a system 100 for providing a virtual environment on at least one computing device, in accordance with an embodiment of the present disclosure. The system 100 comprises a server arrangement 102, a network interface 104, at least one computing device 106 and an input device 112. Furthermore, the at least one computing device 106 includes a display arrangement 108 and a sensor arrangement 110. The server arrangement 102 is operable to generate the virtual environment and use the network interface 104 to provide the at least one computing device 106. Additionally, the user using the at least one computing device 106 is operable to use the display arrangement 108 to view the virtual environment, use the input device 112 to provide input in the virtual environment. Furthermore, the at least one computing device 106 is operable to determine a movement of the user using the sensor arrangement 110. Moreover, the input provided by the user via the input device 112 and data related to the movement of the user determined using the sensor arrangement 110 is provided to the server arrangement 102 via the network interface 104. Additionally, the at least one computing device 106 is a smartphone including a head-mounting arrangement connected to an input device such as a mouse via USB.

FIG. 1 is merely an example, which should not unduly limit the scope of the claims herein. A person skilled in the art will recognize many variations, alternatives, and modifications of embodiments of the present disclosure.

Figure 2:
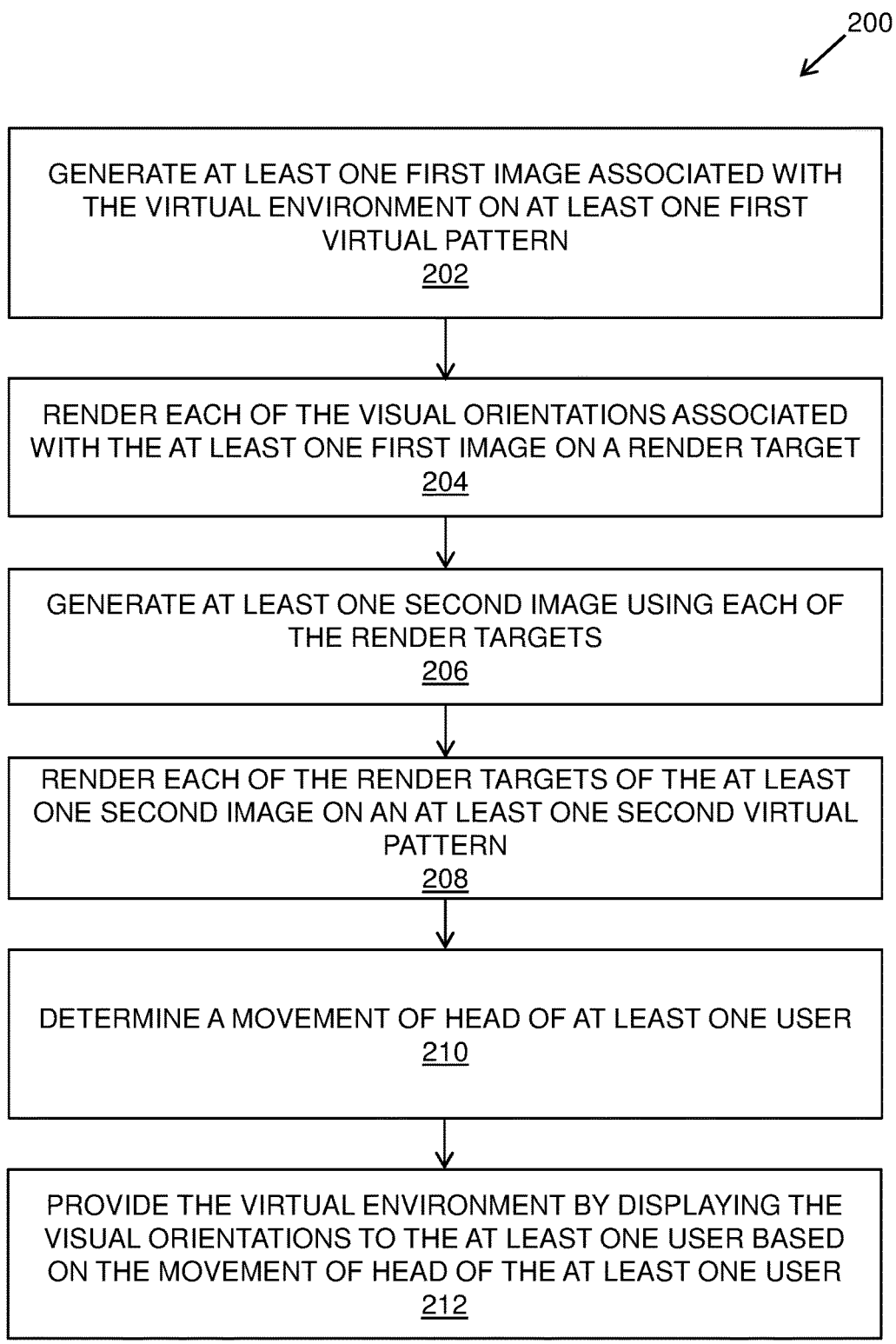
FIG. 2 is an illustration of steps of a method of providing a virtual environment, in accordance with an embodiment of the present disclosure.

Referring to FIG. 2, there are shown steps of a method 200 of providing a virtual environment, in accordance with an embodiment of the present disclosure. At step 202, at least one first image associated with the virtual environment on at least one first virtual pattern is generated, wherein the at least one first virtual pattern corresponds to visual orientations of at least one user within the virtual environment. At step 204, each of the visual orientations associated with the at least one first image on a render target is rendered. At step 206, at least one second image using each of the render targets is generated. At step 208, each of the render targets of the at least one second image on an at least one second virtual pattern is rendered, wherein the at least one second virtual pattern corresponds to visual orientations of the at least one user within the virtual environment. At step 210, a movement of head of at least one user is determined. At step 212, the virtual environment by displaying the visual orientations to the at least one user based on the movement of head of the at least one user is provided.

The steps 212 to 212 are only illustrative and other alternatives can also be provided where one or more steps are added, one or more steps are removed, or one or more steps are provided in a different sequence without departing from the scope of the claims herein. In an example, the first virtual pattern and the second virtual pattern are at least one of: a sphere, or a cube. In another example, the visual orientations of at least one user within the virtual environment comprise at least one: a front view, a rear view, a left view, a right view, a top view, and/or a bottom view. In yet another example, the at least one first image associated with the virtual environment comprises a left visual perspective and a right visual perspective of the at least one user of the virtual environment. In an example, the left visual perspective and the right visual perspective are generated on separate virtual patterns of the at least one first virtual pattern. In another example, the method is further operable to render the left visual perspective on a second virtual pattern associated with left eye of the at least one user and the right visual perspective on a second virtual pattern associated with right eye of the at least one user. In yet another example, the method is operable to render the left visual perspective following a predefined time duration after rendering the right visual perspective, or render the right visual perspective following a predefined time duration after rendering the left visual perspective. In an example, the method further comprises receive at least one input from the at least one user and modify the provided virtual environment based on the at least one input. In another example, the at least one first image and the at least one second image are associated with different image resolutions. In yet another example, the method further comprises establishing a data connection. In an example, the method is further operable to increase or decrease the image resolution of the at least one first image based on a strength of the data connection.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for providing a virtual environment on an at least one computing device, the system comprising:
    a server arrangement operable to:
        generate at least one first image associated with the virtual environment on at least one first virtual pattern, wherein the at least one first virtual pattern corresponds to visual orientations of at least one user within the virtual environment;
        render each of the visual orientations associated with the at least one first image on a render target; and
        generate at least one second image using each of the render targets; and
    at least one computing device communicably coupled with the server arrangement, each of the at least one computing device comprising a display arrangement for displaying the virtual environment to at least one user of the at least one computing device and a sensor arrangement for determining a movement of head of the at least one user,
    wherein the at least one computing device is operable to:
        receive the at least one second image from the server arrangement;
        render each of the render targets of the at least one second image on an at least one second virtual pattern, wherein the at least one second virtual pattern corresponds to visual orientations of the at least one user within the virtual environment;
        determine the movement of head of the at least one user; and
        provide the virtual environment on the display arrangement by displaying the visual orientations of the virtual environment to the at least one user based on the movement of head of the at least one user.

2. A system according to claim 1, wherein the first virtual pattern and the second virtual pattern are at least one of: a sphere, or a cube.

3. A system according to claim 1, wherein the visual orientations of at least one user within the virtual environment comprises at least one: a front view, a rear view, a left view, a right view, a top view, and/or a bottom view.

4. A system according to claim 1, wherein the at least one first image associated with the virtual environment comprises a left visual perspective and a right visual perspective of the at least one user of the virtual environment.

5. A system according to claim 4, wherein the server arrangement is further operable to generate the left visual perspective and the right visual perspective on separate virtual patterns of the at least one first virtual pattern.

6. A system according to claim 5, wherein at least one computing device is further operable to render the left visual perspective on a second virtual pattern associated with left eye of the at least one user and the right visual perspective on a second virtual pattern associated with right eye of the at least one user.

7. A system according to claim 6, wherein the at least one computing device is operable to:
    render the left visual perspective following a predefined time duration after rendering the right visual perspective, or
    render the right visual perspective following a predefined time duration after rendering the left visual perspective.

8. A system according to claim 1, further comprising at least one input device operably coupled with the at least one computing device, wherein the at least one computing device is further operable to:
    receive at least one input from the at least one user using the at least one input device; and
    modify the provided virtual environment based on the at least one input.

9. A system according to claim 1, wherein the at least one first image and the at least one second image are associated with different image resolutions.

10. A system according to claim 1, wherein the at least one computing device is communicably coupled with the server by establishing a data connection via a network interface.

11. A system according to claim 10, wherein the server arrangement is further operable to increase or decrease the image resolution of the at least one first image based on a strength of the data connection.

12. A method of providing a virtual environment, the method comprising:
    generating at least one first image associated with the virtual environment on at least one first virtual pattern, wherein the at least one first virtual pattern corresponds to visual orientations of at least one user within the virtual environment;
    rendering each of the visual orientations associated with the at least one first image on a render target;
    generating at least one second image using each of the render targets;
    rendering each of the render targets of the at least one second image on an at least one second virtual pattern, wherein the at least one second virtual pattern corresponds to visual orientations of the at least one user within the virtual environment;
    determining a movement of head of at least one user; and providing the virtual environment by displaying the visual orientations to the at least one user based on the movement of head of the at least one user.

13. A method according to claim 12, wherein the first virtual pattern and the second virtual pattern are at least one of: a sphere, or a cube.

14. A method according to claim 12, wherein the visual orientations of at least one user within the virtual environment comprises at least one: a front view, a rear view, a left view, a right view, a top view, and/or a bottom view.

15. A method according to claim 12, wherein the at least one first image associated with the virtual environment comprises a left visual perspective and a right visual perspective of the at least one user of the virtual environment.

16. A method according to claim 15, wherein the method is further operable to generate the left visual perspective and the right visual perspective on separate virtual patterns of the at least one first virtual pattern.

17. A method according to claim 16, wherein method is further operable to render the left visual perspective on a second virtual pattern associated with left eye of the at least one user and the right visual perspective on a second virtual pattern associated with right eye of the at least one user.

18. A method according to claim 17, wherein the method is operable to:
    render the left visual perspective following a predefined time duration after rendering the right visual perspective, or
    render the right visual perspective following a predefined time duration after rendering the left visual perspective.

19. A method according to claim 12, the method further comprises:
    receive at least one input from the at least one user; and
    modify the provided virtual environment based on the at least one input.

20. A method according to claim 12, wherein the at least one first image and the at least one second image are associated with different image resolutions.

21. A method according to claim 12, wherein the method further comprises establishing a data connection.

22. A method according to claim 12, wherein the method is further operable to increase or decrease the image resolution of the at least one first image based on a strength of the data connection.

* * * * *